(No Model.)

J. FRIEDLANDER.
HORSE DETACHING DEVICE.

No. 554,118. Patented Feb. 4, 1896.

WITNESSES:
Edward Thorpe
J. Fred Acker

INVENTOR
J. Friedlander
BY Munn & Co
ATTORNEYS.

ANDREW B.GRAHAM, PHOTO-LITHO. WASHINGTON, D.C.

UNITED STATES PATENT OFFICE.

JOSEPH FRIEDLANDER, OF SAN ANTONIO, TEXAS, ASSIGNOR TO JOSEPHINE FRIEDLANDER, OF SAME PLACE.

HORSE-DETACHING DEVICE.

SPECIFICATION forming part of Letters Patent No. 554,118, dated February 4, 1896.

Application filed October 14, 1895. Serial No. 565,581. (No model.)

*To all whom it may concern:*

Be it known that I, JOSEPH FRIEDLANDER, of San Antonio, in the county of Bexar and State of Texas, have invented a new and Improved Horse-Detaching Device, of which the following is a full, clear, and exact description.

My invention relates to a horse-detaching device especially designed for attachment to the forward axle of a vehicle; and the object of the invention is to provide a device which will not interfere in the slightest degree with the seating capacity of the vehicle, and which may be conveniently and expeditiously manipulated to release the thills or pole of a vehicle from connection therewith, thereby permitting the animal or animals drawing the vehicle to be quickly released in the event they become unmanageable.

Another object of the invention is to so construct the releasing device that it may be employed to guide the vehicle after the release of the animals.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1:
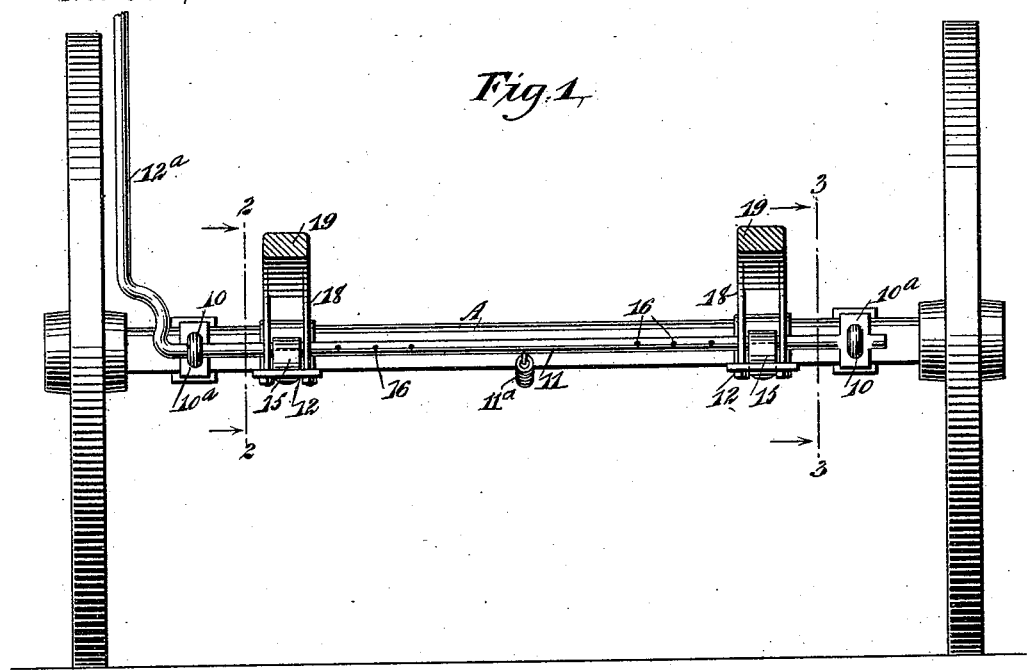
Figure 2:
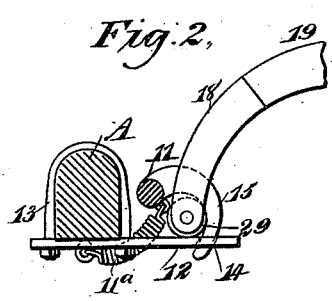
Figure 3:
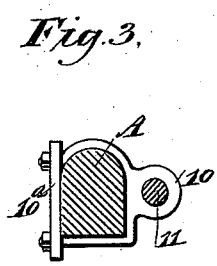
Figure 4:

Figure 1 is a front elevation of the forward axle of a vehicle and a vertical section through the thills, taken adjacent to the axle. Fig. 2 is a vertical section taken substantially on the line 2 2 of Fig. 1. Fig. 3 is a similar section taken on the line 3 3 of Fig. 1; and Fig. 4 is a transverse section through the shaft, illustrating a detachable connection between said shaft and one of the hooks to be carried thereby.

In carrying out the invention bearings 10 are secured by clips $10^a$ or other fastening devices to the forward portion of the front axle A of the vehicle at any suitable points thereon. Preferably, however, these bearings are located one near each end near the traction-wheels, as shown in Fig. 1. The bearings are adapted to journal a shaft 11, which extends parallel with the front axle, and the said shaft is provided with a handle-bar $12^a$, which is carried upward either through the bottom of the vehicle-body or at one side thereof, preferably the latter, and usually the handle-bar is integral with the axle.

Between the bearings 10 two plates 12 are secured upon the bottom portion of the axle through the medium of clips 13 or their equivalents, and these plates extend horizontally in a forward direction. Each plate is provided with a transverse slot or opening 14 near its forward end, and upon the said shaft 11 hooks 15 are located, adapted to enter the aforesaid openings 14 of the plates. The hooks correspond in number to the number of plates employed, and these hooks may be either integral with the shaft, as shown in Fig. 2, or may be detachable therefrom, as illustrated in Fig. 4. In the latter event the shaft 11 is provided with a series of apertures 16, having their walls threaded to receive a screw-shank 17 formed upon the heel portions of the hooks, or the hooks may be loosely mounted upon the shaft and held in place by set-screws. By this construction it will be seen that the hooks are made adjustable longitudinally along the shaft, so that they may be set fast to the shaft in the proper position for engaging the thill-irons.

The thill-irons 18 secured to the thills 19 are bifurcated, and at their lower ends a roller 29 is journaled; but this roller may be omitted if in practice it is found desirable, although ordinarily and preferably it is employed. When the rollers are used, the hooks are preferably made with cavities $15^a$ in their inner faces, forming pockets for the rollers. The hooks are held in engagement with their keeper-plates 12 by a spring $11^a$, which is secured to the shaft 11 and the axle A, as shown in Fig. 2.

In the operation of the device the thill-irons are placed upon the plates 12, the handle-bar $12^a$ having been manipulated in a manner to carry the hooks 15 upward out of their openings 14 in said plates, and when the handle-bar is released the spring $11^a$ returns the hooks to the plates, whereby the rollers 29 in the thill-irons will bear against the inner faces of the hooks and these faces will sustain the draft. Under this construction it is obvious that the hooks will not disengage from the plates while tension is exerted thereon in a forward direction; but if in practice it is found desirable the slots 14 in the plates 12 may be provided with rubber cushions to assist in holding the hooks in engagement with the plates and to prevent rattling.

In the event the animal or animals attached to the vehicle should become unruly, by carrying the handle-bar rearwardly, for example, the hooks 15 will be carried out of engagement with the plates 12, the thill-irons will be released and the animal may escape from the vehicle, and by continuing to hold the handle-bar and manipulating the same it may be employed to direct the vehicle to the side of the road, or the vehicle may be guided by the handle-bar to any other point desirable.

The device is exceedingly simple, it is durable and economic and may be applied to any vehicle, and by reason of the apertures 16 in the shaft the hooks may be adjusted on the said shaft wherever necessary to accommodate thills of different widths.

Having thus described my invention, I claim as new and desire to secure by Letters Patent—

1. In a horse-detaching device, the combination of an axle, a shaft extending longitudinally of the axle and journaled at opposite ends thereon, hooks mounted adjustably on and projecting forwardly from the shaft, plates secured to the axle opposite the hooks and provided with perforations to receive the ends of the hooks, thills having bifurcated ends arranged to receive between their bifurcations the hooks on the shaft, and rollers journaled at their ends in the bifurcations of the thills and extending across the space between the same in position to engage under the said hooks, substantially as set forth.

2. In a horse-detaching device, the combination of an axle, a shaft extending longitudinally thereof and journaled at its opposite ends on said axle, said shaft having one end bent to form a crank-handle whereby the shaft may be turned, the intermediate portion of said shaft being provided with apertures arranged in longitudinal series, hooks each adapted to be inserted and held in the apertures in the shaft and when so held to project forwardly from the shaft, plates secured to the axle opposite the hooks and having perforations for the passage of said hooks when the shaft is turned, a spring for holding said shaft with its ends normally engaged with said perforations, thills having bifurcated arms, the bifurcations of which receive between them the respective hooks, and rollers journaled at their ends in the perforations of the respective thill-irons and extending across the space in the same in position to engage the said hooks, substantially as set forth.

JOSEPH FRIEDLANDER.

Witnesses:
JNO. A. FRASER,
FERD. HERFF, Jr.